US008738663B2

(12) United States Patent
Gonzalez et al.

(10) Patent No.: US 8,738,663 B2
(45) Date of Patent: May 27, 2014

(54) RULE-BASED TRANSFORMATION OF METADATA

(75) Inventors: Zandro Luis Gonzalez, Foster City, CA (US); Xiaoge Zhang, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 994 days.

(21) Appl. No.: 10/754,355

(22) Filed: Jan. 9, 2004

(65) Prior Publication Data

US 2005/0154695 A1   Jul. 14, 2005

(51) Int. Cl.
*G06F 17/30* (2006.01)

(52) U.S. Cl.
USPC ................ 707/803; 707/702; 707/694

(58) Field of Classification Search
None
See application file for complete search history.

(56) References Cited

U.S. PATENT DOCUMENTS

| | | | | |
|---|---|---|---|---|
| 4,805,099 | A | 2/1989 | Huber | 364/300 |
| 6,366,917 | B1* | 4/2002 | St. John Herbert, III | 707/100 |
| 6,490,590 | B1* | 12/2002 | Fink | 707/100 |
| 6,535,868 | B1* | 3/2003 | Galeazzi et al. | 707/2 |
| 2004/0181534 | A1* | 9/2004 | Mortensen et al. | 707/100 |
| 2005/0125371 | A1* | 6/2005 | Bhide et al. | 707/1 |
| 2006/0242563 | A1* | 10/2006 | Liu et al. | 715/513 |

OTHER PUBLICATIONS

Greenwald et al., Oracle Essentials: Oracile9i, Oracle8i, & Oracle8, 2nd Edition section 2.4 "The Data Dictionary".*
Steve Muench, "Building Oracle SML Applications" published Sep. 2000, by O'Reilly, pp. 1-883.*
Greenwald et al., Oracle Essentials: Oracile9i, Oracle8i, & Oracle8, 2nd Edition section 2.4 "The Data Dictionary". 2001.*
"Oracle9i XML Sample: Metadata Sample with the Oracle9/Metadata API", Jan. 2004, pp. 1.
"Oracle XML DB, An Oracle Technical White Paper", Jan. 2004, pp. 1-94.
"Enhancing Productivity with Oracle 9i Warehouse Builder Scripting", (described at pp. 12-13), An Oracle White Paper, Feb. 2003, pp. 1-19.
Steve Muench, "Transforming XML with XSLT" "Building Oracle SML Applications" published Sep. 2000, by O'Reilly, pp. 1-24.
Victor Votsch and Mark Walter, "Oracle XML BD: Uniting XML Content and Data", Mar. 2002, Seybold Consulting Group, pp. 1-14.
"Oracle Change Management Pack", Oracle Technology Network, Copyright 2004 Oracle Corporation, pp. 1-5.
"Embed Oracle Warehouse Builder in your applications using scripting", Oracle Warehouse Builder 10g, An Oracle White Paper, Feb. 2004, pp. 1-19.
Forgy, C.L. "Rete: A Fast Algorithm for the Many Pattern/Many Object Pattern Match Problem", Artificial Intelligence, vol. 19, Issue 1, Sep. 1982, pp. 17-37.

* cited by examiner

*Primary Examiner* — Syed Hasan
(74) *Attorney, Agent, or Firm* — Omkar K. Suryadevara; Silicon Valley Patent Group LLP (57) ABSTRACT

A computer automatically reads each object in a metadata that is descriptive of a database. Then the computer automatically applies a number of rules, to check if the object triggers a rule. If so, then the computer automatically changes the metadata as per an action identified by the triggered rule. After all rules are applied to the object, and after all objects in the metadata are processed, the resulting metadata is used to change the database's structure. The objects may be read from the metadata in an order (e.g. hierarchy) specified in meta-metadata that is descriptive of the metadata.

35 Claims, 8 Drawing Sheets

| KEYWORD | ACTION | PRIORITY | KIND |
|---|---|---|---|
| T1 | REPLACE_COL_LENGTH | 1 | PRE |
| T1 | UPDATE_FKs | 1 | POST |
| T1 | ADD_COLUMN_C3 | 10 | PRE |
| T1 | MISC_T1_ACTIONS | 1 | PRE-POST |

RULE-BASED TRANSFORMATION OF METADATA

BACKGROUND OF THE INVENTION

Manual use of computer systems to prepare a software product for release to customers is well known in the art. Typically, each version of a software product is associated with a version number at the time of release that uniquely identifies the version as compared to a previous version. At a customer site, when replacing an old version of database with a new version, it is necessary to first export data that is currently contained in the old database, and then replace the database, and then import the data into the new database. Such data export and import is normally performed by use of scripts (a pre-programmed set of database instructions).

A script for export of data from a database may contain instructions to read the data currently held in several rows of a table in the old database. In addition to export of data, when versioning a database (replacing one version with another) it is also necessary to define the structure of each table in the old database so that an identical table can be recreated in the new database, before importing data into the new database. For example, the number of columns and the attributes of each column (such as length and scale), and the order in which the columns are present in a table define the structure of the table. Such information is called metadata, and may also contain the relationship of a column in the table to another column in the same table or in another table (such as a foreign key relationship).

Prior art which teaches deriving metadata from structures of objects within a database, for the purposes of creating a repository of information describing the database, includes U.S. Pat. No. 4,805,099 granted Val J. Huber. This patent is incorporated by reference herein in its entirety. Once metadata is prepared for any customer site, it can be used as often as necessary, during any number of versioning acts, as long as the database versions are compatible with one another. Any incompatibility between database versions can be resolved by a database manager manually changing the metadata for an existing database, e.g. to make the metadata work with a new version of the database.

U.S. Pat. No. 6,366,917 entitled "Method of modifying a populated database structure by modifying metadata describing the database structure" granted to St. John Herbert, III on Apr. 2, 2002 is incorporated by reference herein in its entirety. This patent describes modifying a database structure by first modifying metadata that describes the relevant database structure (e.g. by modifying a description of a database object characteristic in a metadata object). Thereafter, the relevant database structure is automatically modified to conform to the modified metadata. Everyone is requested to review this patent thoroughly, although one example is described next.

In an example described at column 7, lines 32-47 of U.S. Pat. No. 6,366,917, a database manager changes the format of all estimated delivery date columns within the database, by altering the type specification in a single "COLUMNS" object to reflect the long date format. On doing so, all records within a "TABLE_COLUMNS" object that specify the estimated date column, and that are accordingly dependent on the COLUMNS object include this updated information by reason of their dependencies. Then, objects are generated and/or updated in the database automatically, to reflect the modification. Similarly, a database manager could alter the length of the long date format from eight to nine characters in the metadata, and this change is propagated to all relevant objects within the database by reason of dependencies that exist within the metadata database.

A tool for creation and management of metadata is Oracle Warehouse Builder (OWB). OWB is an enterprise integration design tool that manages the full life cycle of metadata for the Oracle9i database. As such, the OWB tool has capabilities to deal with changes in the entire environment at a customer site, to allow effective maintenance of both metadata and data. OWB uses a language called OMB (Oracle MetaBase) to manipulate the metadata in an efficient way. OMB has a graphical user interface. Each of the following two documents is also incorporated by reference herein in its entirety. The first document is entitled "Oracle 9i XML Sample: Metadata Sample with the Oracle9i Metadata API" available on the internet at otn-oracle-com/tech/xml/xdk_sample/metadatasample.html. The second document is entitled "Oracle XML DB, An Oracle Technical White Paper" published January 2003, also incorporated by reference. This document is available on the Internet at otn-oracle-com/tech/xml/xmldb/pdf/XMLDB_Technical_Whitepaper.pdf.

An article entitled "Enhancing Productivity with Oracle9i Warehouse Builder Scripting," published February 2003 describes, at pages 12-13 an example script to update all tables in a database with a set of columns for the creation date. Instead of using the graphical user interface and touching all tables, the article describes how to run a script. This article is also incorporated by reference herein in its entirety. Metadata definitions can also be changed during conversion of data from a database into XML by use of XSLT. For example, XSLT may be used to convert the metadata into a tree structure (based on DOM API), followed by application of template rules to transform the initial tree into a modified tree, followed by conversion of the modified tree into metadata. Presence of the just-described two trees in memory at the same time can be a significant burden, depending on the size of the tree. XSLT is described in Chapter 7 entitled "Transforming XML with XSLT" in a book by Steve Muench entitled "Building Oracle XML Applications" published September 2000, by O'Reilly, which is incorporated by reference herein in its entirety and is available on the Internet at www-oreilly-com/catalog/orxmlapp/chapter/ch07.html.

SUMMARY OF CERTAIN EMBODIMENTS OF THE INVENTION

A method in accordance with the invention automatically reads each object in a metadata (wherein the metadata is descriptive of a database), and automatically applies a number of rules, to check if the object triggers a rule. If so, then the method automatically changes the metadata by performing an action identified by the triggered rule. After all rules are checked against the object, another object in the metadata is processed. Note that in several embodiments, it is not necessary for more than one object of the metadata to be in memory at any time. After all objects in the metadata are processed, the resulting metadata (which has been changed by performance of one or more actions) can be used to change the database.

In some embodiments, objects in the metadata are read in a particular order that is specified in additional data which is called "meta-metadata." The meta-metadata is a higher level of abstraction than the metadata (which is a model of the data itself). For example, if the metadata indicates that a table T1 has two columns C1 and C2 and a foreign key FK, then the meta-metadata describes an object of type "table" and that it owns an object of type "column" and another object of type "foreign key." The meta-metadata identifies a top down hierarchy in this example, and therefore a table object is read (from the metadata) before reading of its column objects (also from the metadata).

Also, in several embodiments, a computer is programmed to act as a state machine to transform one version of a database to another version. Specifically, in a first operation, the state machine uses meta-metadata to read and change metadata as noted above. Thereafter, in a second operation, the state machine uses the changed metadata to change the database itself, e.g. by generating a database having a new structure or by changing an existing structure of the database. The state machine repeats these two operations as often as necessary, so as to transition the database from an older version to the most current version. With the state machine's use of meta-metadata, the versioning of a database becomes a data-driven activity, thereby to minimize or even eliminate in some cases one or more transformations and business logic changes that are otherwise required to be manually made by a programmer.

In some embodiments, the computer is programmed to perform the above-described second operation by (1) externalizing the data of an old version of the database into a file, (2) creating a new version of the database using the changed metadata, and (3) internalizing the data from the file into the new version of the database. In certain embodiments, when performing the second operation, the computer may temporarily store the data from an old version of the database into a memory location, create a new version of the database using the changed metadata, and restore the data from the memory location into the new version of the database. In such embodiments, the computer may be programmed to repeatedly use the temporary memory location for each of several smaller portions of the database, instead of processing the entire data of a database as a whole. In certain other embodiments, instead of operating on data in a database, the computer may read the data from and write the data to files. The computer may also read the data from one type of resource and write to another type of resource (e.g. file to database or database to file).

DETAILED DESCRIPTION OF SEVERAL EMBODIMENTS OF THE INVENTION

A computer 100 (FIG. 1A) is programmed in accordance with the invention with software 120 (called "metadata transformer") so as to use a set of predetermined rules 110 to automatically transform metadata 152 that describes a database 151. The types of transformations that may be done include a change to the value of any attribute of any structure in database 151 (such as the length of a date field), as well as changes to relationships within database 151 (such as the relation of a foreign key to a column).

The changed metadata 155 is thereafter used by additional software (called "database upgrader") 130 to change the content of data stored in database 151, e.g. to create a changed database 157 in database management system 150 that also contains the original database 151. Although predetermined rules 110, metadata transformer 120, database upgrader 130, database management system 150 (which contains database 151) are all illustrated in FIG. 1A as being physically located within a single computer 100, it will be apparent to a skilled programmer that one or more of these can be physically located in one or more other computers that are connected to and accessible from computer 100.

Moreover, although only output format is mentioned above, i.e. saving in database management system 150, other output formats, such as a file format, can also be used. For example, metadata transformer 120 may save the changed metadata 155 in a file system (shown as metadata 190). Alternatively, metadata transformer 120 may simply overwrite the original metadata 152 with the changes (as shown by dashed line 191). Also, database upgrader 130 may overwrite original database 151 with the changes (as shown by dashed line 192), instead of creating a new database 157. Some embodiments of metadata transformer 120 support each of the just-described output options for either or both of metadata and database, and the user may select any one or more of them depending on their need. Moreover, in some embodiments, metadata transformer 120 reads the metadata from a file system, as illustrated by metadata 102 in FIG. 1A. Note also that predetermined rules 110 may be held either in a file system or in a database management system, depending on the embodiment. Also note that any of the above-described data may be stored in a resource other than a file system and a database management system, e.g. in flash memory.

In order to transform metadata 152 that is descriptive of the structure of database 151, metadata transformer 120 (FIG. 1B) automatically reads an object from metadata 152 (as shown by act 121), automatically checks (as per act 122) if the object triggers a rule (from among the predetermined rules 110), and automatically changes the metadata (as per act 123) by performing an action that is associated with the rule, if the rule is triggered by the object. In this manner, metadata transformer 120 processes all the rules (e.g. by returning to act 122 if there are additional rules to be processed as per act 124). Once all rules have been checked, then metadata transformer 120 automatically performs all of the just-described acts repeatedly, for all objects (e.g. by returning to act 121 if there are any additional objects to be processed as per act 125). When all objects in metadata 152 have been processed, transformation of the metadata is complete. The changed metadata 155 (FIG. 1A) can then be used, by database upgrader 130, to change database 151 as described below in reference to FIG. 4.

Figure 1A:
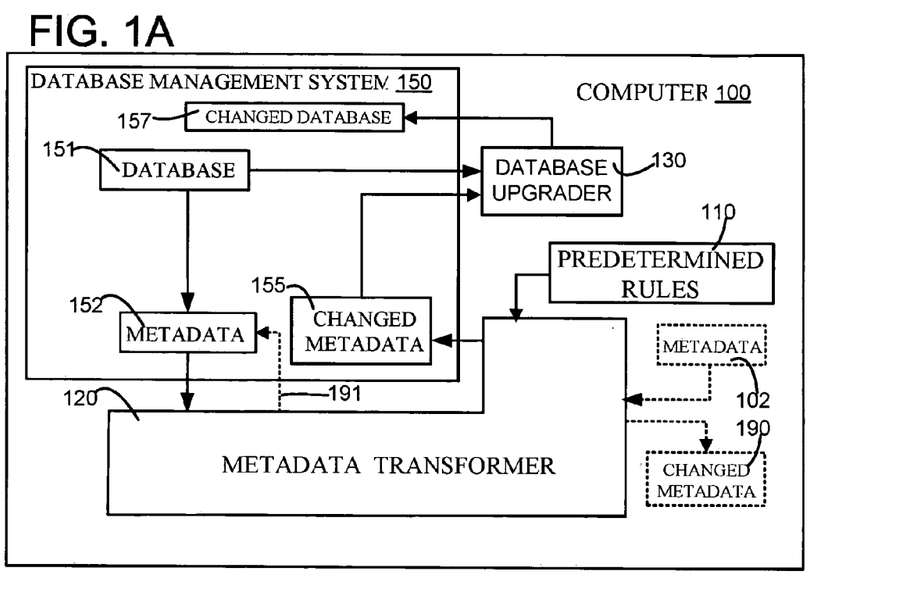
FIG. 1A illustrates, in a high-level block diagram, a computer that is programmed with software (called metadata transformer) to transform metadata by application of predetermined rules in accordance with the invention.
Figure 1B:
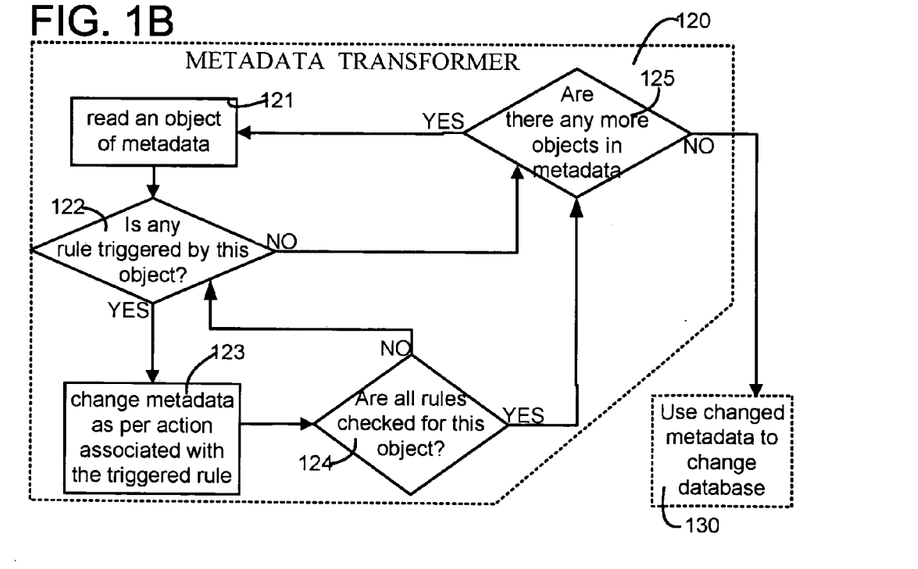
FIG. 1B illustrates, in a high-level flow chart, acts performed during transformation of metadata by a metadata transformer of the type illustrated in FIG. 1A.

As seen from the illustrations in FIGS. 1A and 1B and the related description above, when using a computer of the type just described, the user does not manually change any of the metadata (in contrast to U.S. Pat. No. 6,366,917). Instead, in some embodiments, an object on which the above-described acts are to be performed is automatically selected in many embodiments of the invention (from among all objects in the metadata). Depending on the embodiment, selection of objects from the metadata may be performed in a predetermined order, e.g. by traversing a tree structure inherent in the metadata. When such a predetermined order of traversal is used (e.g. breadth-first traversal may be used), there is no input from the user as to the object to be changed (in contrast to U.S. Pat. No. 6,366,917). Moreover, in several embodiments, a change to be made to the metadata is not specified by a user directly on the metadata (in contrast to U.S. Pat. No. 6,366,917). Instead, in such embodiments, a database manager specifies several rules that are all to be applied to each object. If any object triggers any rule, then an action specified by the rule is directly performed by computers of many embodiments, without any flags or marks about any changes to the metadata. Therefore, such computers directly change the metadata, in contrast to U.S. Pat. No. 6,366,917.

Many embodiments in accordance with the invention traverse the above-described tree structure inherent in the metadata in a top down fashion. In some embodiments, depth-first traversal is used (e.g. in the embodiment illustrated in FIGS. 2C and 2D described below). Breadth-first traversal would work equally well if the transformation rules of a certain implementation are mostly indifferent to inter-component associations. So for value rules, it would work just as well. The specific order of visitation of objects in metadata 152 (during traversal of the tree structure) is not important for value-based rules (rules that are independent of any other object). Alternatively, the order of visitation is predetermined for some rules, such as rules that need to change associations, for example, foreign key to unique key transformation rules, the unique keys have to have been processed first so that the computer can keep track of key.

Metadata transformer 120 of several embodiments includes two components, namely a metadata reader 126 (FIG. 2A) that reads metadata objects one at a time, and a rules engine 127 (FIG. 2A) that applies all the rules 110 to each object (e.g. metadata object "J") that has been read. Note that no signal is required between metadata reader 126 and rules engine 127 in FIG. 2A in some embodiments, because all the information for the rules is passed on to a commonly accessed entity (called "mediator") which is used by both 126 and 127 to access the database management system.

Figure 2A:
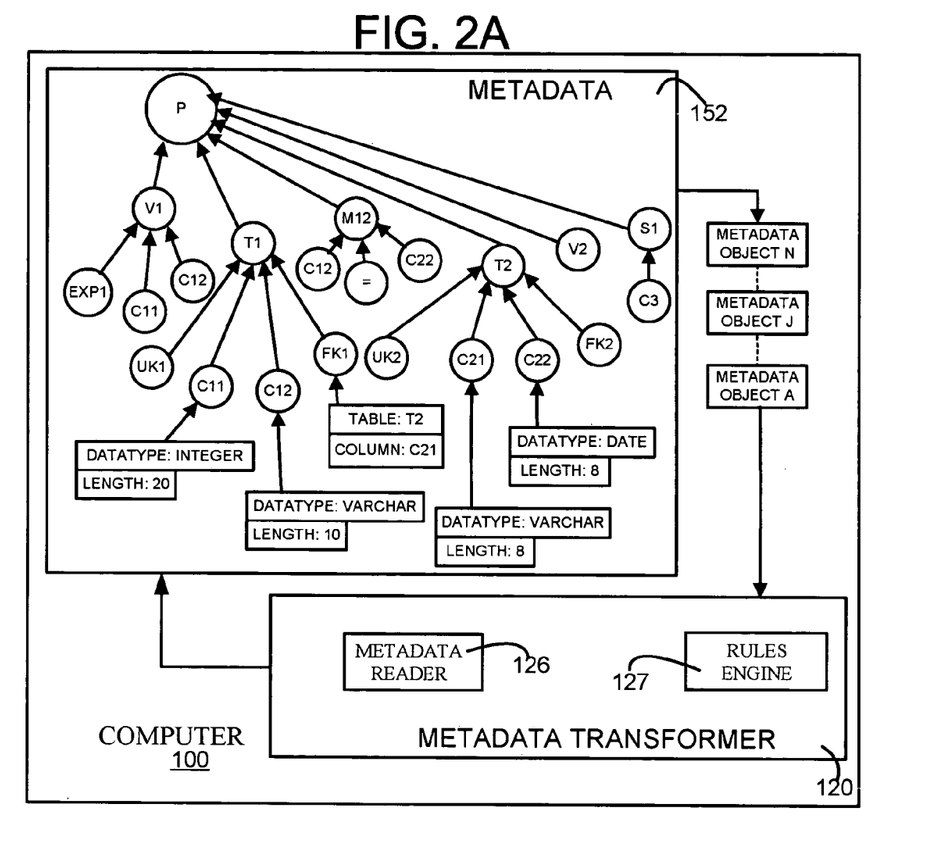
FIG. 2A illustrates a metadata reader and a rules engine that are included in a metadata transformer of the type illustrated in FIG. 1A; also shown in FIG. 2A is an illustration of an example of metadata.

In some embodiments, metadata reader 126 traverses a tree of objects in metadata 152 in a top down breadth first manner. In an example that is illustrated in FIG. 2A, the metadata 152 has a number of nodes, one for each table that belong to a project (e.g. tables T1 and T2 belong to project P). In addition, there is one object for each view, that belongs to the project (e.g. views V1 and V2 also belong to the project P). Similarly, there is one object for each map (e.g. map M12 that maps between tables T1 and T2), and one for each sequence number (e.g. sequence number S1). Therefore, all the just-described objects are visited in turn, regardless of any objects that may belong to these objects.

Note that the illustration in FIG. 2A is merely exemplary. For example, the columns C11 and C12 are shown duplicated for each of T1 and V1, but in a different embodiment FIG. 2A may show only one column C11 which is shown connected to each of T1 and V1 (and similarly only one column C12 shown connected to each of T1 and V1 and also to M12). This is because in some embodiments, a database view contains columns that are named and thus separate instances. In such embodiments, a binding association exists between the view's columns and the table columns, but the two instances are distinct from each other. This is the same for maps as well in these embodiments. However, other embodiments may have a different implementations of maps, for example use of pointers eliminates need for multiple instances of columns.

In several embodiments, metadata reader 126 visits all children of an object, and then for each child it then visits all grandchildren that belong to the child, and so on. In the above-described example, metadata reader 126 visits all objects that are of the type "table" (e.g. T1 and T2 in FIG. 2A), and then visits all objects of the type "view" (e.g. V1 and V2 in FIG. 2A), and then visits all objects of the type "map" (e.g. M12 in FIG. 2A), and then visits all objects of the type "sequence" (e.g. S1 in FIG. 2A). In this example, after visiting all the just-described child objects (T1, T2, V1, V2, M12 and S1) of the root object P, metadata reader 126 then visits all the grand-children. When visiting the grandchildren, metadata reader 126 first visits all children (unique key UK1, columns C11, C12 and foreign key FK1) of the first table object T1, followed by all children (unique key UK2, columns C21, C22 and foreign key FK2) of the second table object T2, followed by all children (expression EXP1, columns C11 and C12) of the first view object V1, followed by all the children (not shown for simplicity of the drawing) of the second view V2, followed by all the children (columns C12, C22, and transformation "=") of the map M12, and then all children (in this case only column C3) of the sequence S1. For this reason, column object C11 is visited only after visiting an object (such as table object T1 or view object V1) that owns column object C11.

Figure 2B:
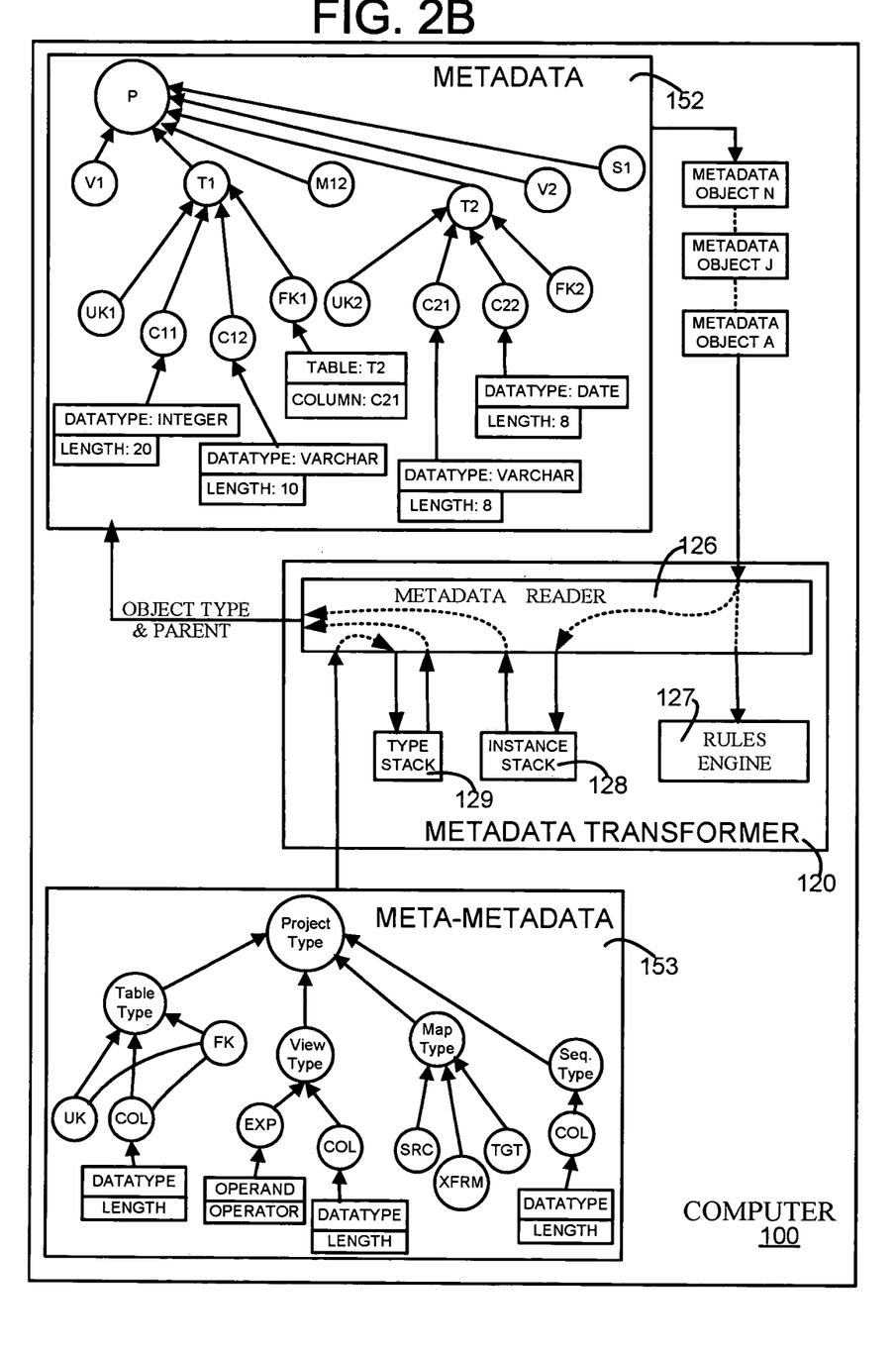
FIG. 2B illustrates an exemplary meta-metadata being used by a metadata reader (of the type illustrated in FIG. 2A) to read a number of metadata objects one at a time, from an exemplary metadata (also of the type illustrated in FIG. 2A).

In some embodiments, metadata reader 126 automatically selects each of the objects from metadata 152 in the above-described order, by use of parent-child relationships described in meta-metadata 153 (e.g. see FIG. 2B). Specifically, meta-metadata 153 is descriptive of a hierarchy of object types for the objects in metadata 152. Note that meta-metadata 153 also has a tree structure (similar to metadata 152) except that under each parent object there is only one child object of any given type. For example, under a root object (which is of type "project"), there can be only one object which is of type "table", only one object of type "view", only one object of type "map", and only one object of type "sequence".

Moreover, meta-metadata 153 also contains one object for each type of child of each of the just-described types of objects. For example, the table type object has at least three different types of children namely: a unique-key type object UK, a column type object COL, and a foreign-key type object FK. Similarly, the view type object has at least two different types of children namely: a column type object COL, and an expression type object EXP. Furthermore, the map type object has three different types of children: a source type object SRC, a target type object TGT, and a transformation type object XFRM. Finally, the sequence type object has at least one type of child: the column type object COL.

When viewed as a whole, meta-metadata 153 has several objects that are of the same type (e.g. there are three column type objects COL), although any given type (e.g. the table type node) has only one column type node. Note that meta-metadata 153 may identify other relationships, in addition to parent-child relationships, such as an inter-component relationship (e.g. between foreign key type and unique key type), and an intra-component relationship (e.g. between foreign key type and column type). Meta-metadata 153 also identifies one or more attributes of one or more nodes, e.g. a column type object may have datatype and length attributes and an expression type object may have operand and operator attributes. In some embodiments, meta-metadata 153 is generated by use of a tool that provides API access to the metadata 152 (such as Rational Rose available from IBM or JDeveloper available from Oracle) which is prepared from UML instructions. Note that in some embodiments a UML model of a user's application is prepared during the design of database 151 (FIG. 1A). UML stands for uniform modeling language that is commonly used in the industry for object oriented designs.

Note that metadata reader 126 of some embodiments does not use cross-component and intra-component information during tree traversal of the type described herein, but such information is used for transformations that work on such associations. The nature of the rules determines what information is maintained in metadata 152 and meta-metadata 153 in any particular embodiment. As a general practice, having all aspects of the meta-metadata (such as the just-described cross-component and intra-component information) enables the embodiment to be more generic (and useful for all kinds of rules).

In some embodiments, metadata reader 126 uses two stacks for processing objects from each of meta-metadata 153 and metadata 152, as illustrated in FIG. 2B. Specifically, a first stack 129 (also called "type stack") is used to temporarily store object types that are read from meta-metadata 153, and a second stack 128 (also called "instance stack") is used to temporarily store objects that are read from metadata 152. Temporary storage is necessary to ensure that all types and objects that are read from a given level (during breadth-first traversal) are later used to go the next level below that type or object. For example, type stack 129 temporarily holds the view, map, and sequence types while the next level of the table type is being traversed. Similarly, instance stack 128 holds the table object T2, view objects V1 and V2, map object M12, and sequence object S1 while the next level of table object T1 is traversed. When the next level has been traversed (or if there are no children), then that specific type and/or object are popped from their respective stacks.

Therefore, in several embodiments, meta-metadata 153 informs metadata reader 126 how to load the objects in the metadata 152. For example, for a table that is located on top of instance stack 128, meta-metadata 153 tells metadata reader 126 that metadata 152 contains columns, and foreign keys and unique keys. Then metadata reader 126 retrieves from metadata 152 all the columns for the table that is currently on top of the instance stack, and then all the foreign keys for this table, and then all unique keys for this table. Each retrieved object in turn is pushed on instance stack 128, so that it may in turn be used to retrieve all its children. Therefore, in the just-described operation, all columns, all foreign keys and all unique keys for this table are pushed onto the instance stack.

As an example, if a project is called "P" then meta-metadata 153 tells metadata reader 126 there are the following types of children: table, view, map and sequence. So metadata reader 126 loads all table objects where the parent is "P" and the table objects can be any number (T1, T2 etc). These tables T1 and T2 are the client tables (such as tables of a law office). Next, metadata reader 126 loads from meta-metadata 153 all the children types for the table type: column type, unique-key type and foreign-key type. Then metadata reader 126 pushes all these children types onto the type stack. Next, metadata reader 126 loads from metadata 152 all the columns where the parent is table T1. So it loads C11 and C12 columns which belong to table T1. Next, in this example, metadata reader 126 pops the column type from the type stack, and finds that the top of the type stack now has the foreign-key type. Therefore, metadata reader 126 next loads from metadata 152 all foreign keys where the parent is table T1, and so on.

As noted above, several embodiments of the metadata reader 126 use not only the top of the type stack and the instance stack, but also see how deep the traversal is currently at relative to the tree being traversed (i.e. which level). Depending on where the traversal is, the type level and the instance level can be different. When the type level is equal to the instance level, then metadata reader 126 gets all the child types. If there is no child type, then metadata reader 126 pops the instances from the instance stack. If it does have children, then metadata reader 126 gets the children and pushes all the children on the type stack. If the type level is greater than the instance level (and this relation can never be less) then metadata reader 126 processes the aggregate association (which is a grand child relationship). Metadata reader 126 gets the aggregate association and if it exists, then it pushes the element of the instance stack. If the current instance has children, then metadata reader 126 gets all the instances of that specific child and pushes them on the instance stack.

In the above described example, when each object (e.g. table T1 or column C11) is retrieved from metadata 152 by metadata reader 126, at that same time the necessary transformation is performed by rule engine 127 on the retrieved object. So when table T1 is loaded, the rule engines 127 is invoked by metadata reader 126, and rules engine 127 then uses rules 110 (FIG. 1A) to perform the transformation on the table T1, and updates the old table T1 (e.g. over-writes it). The rules engine 127 is now done with table T1. Some embodiments use a method illustrated in FIGS. 2C-2D as described below to traverse metadata 152 by use of meta-metadata 153.

Figure 2C:
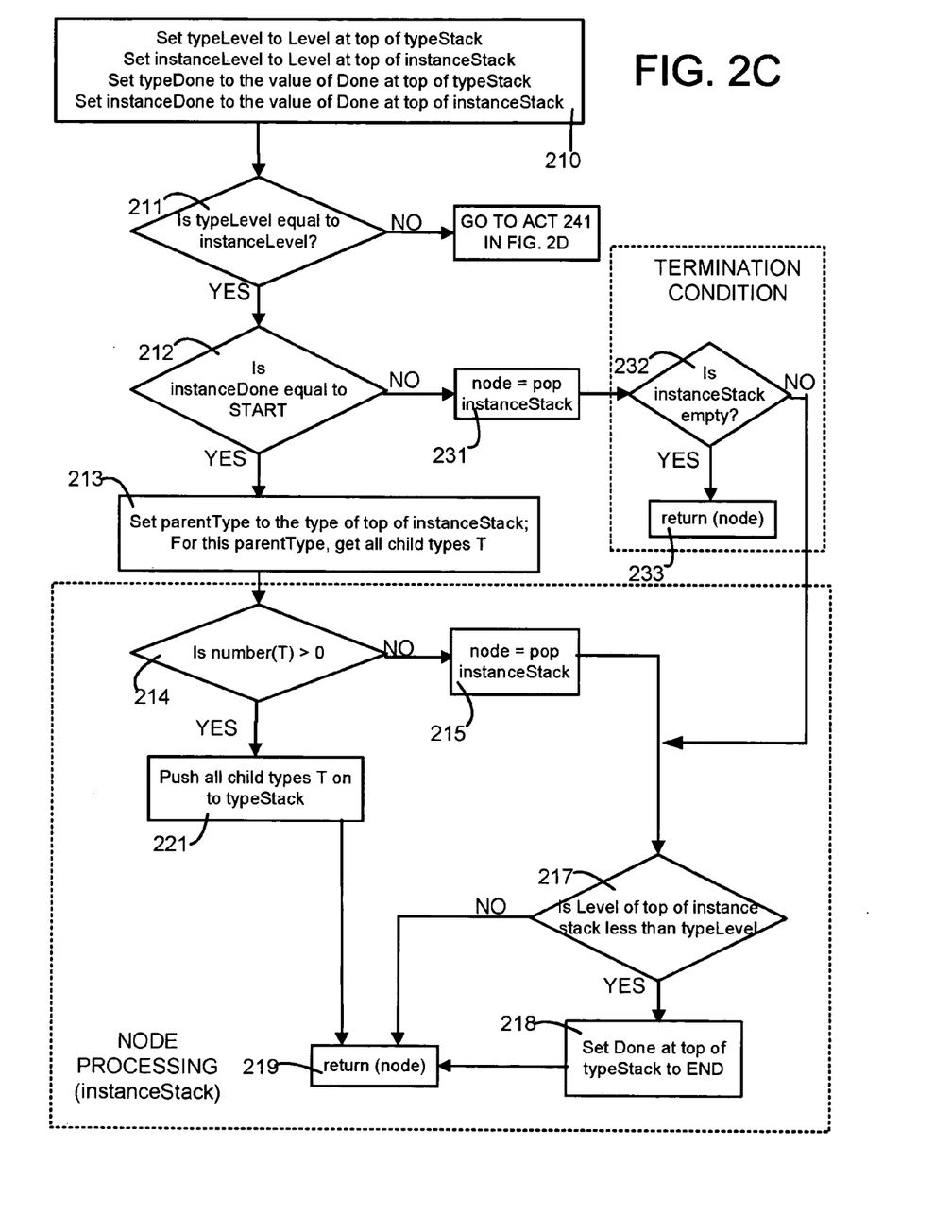
FIGS. 2C and 2D illustrate, in a flow chart, acts performed in some embodiments of the invention to traverse a tree of metadata objects.
Figure 2D:
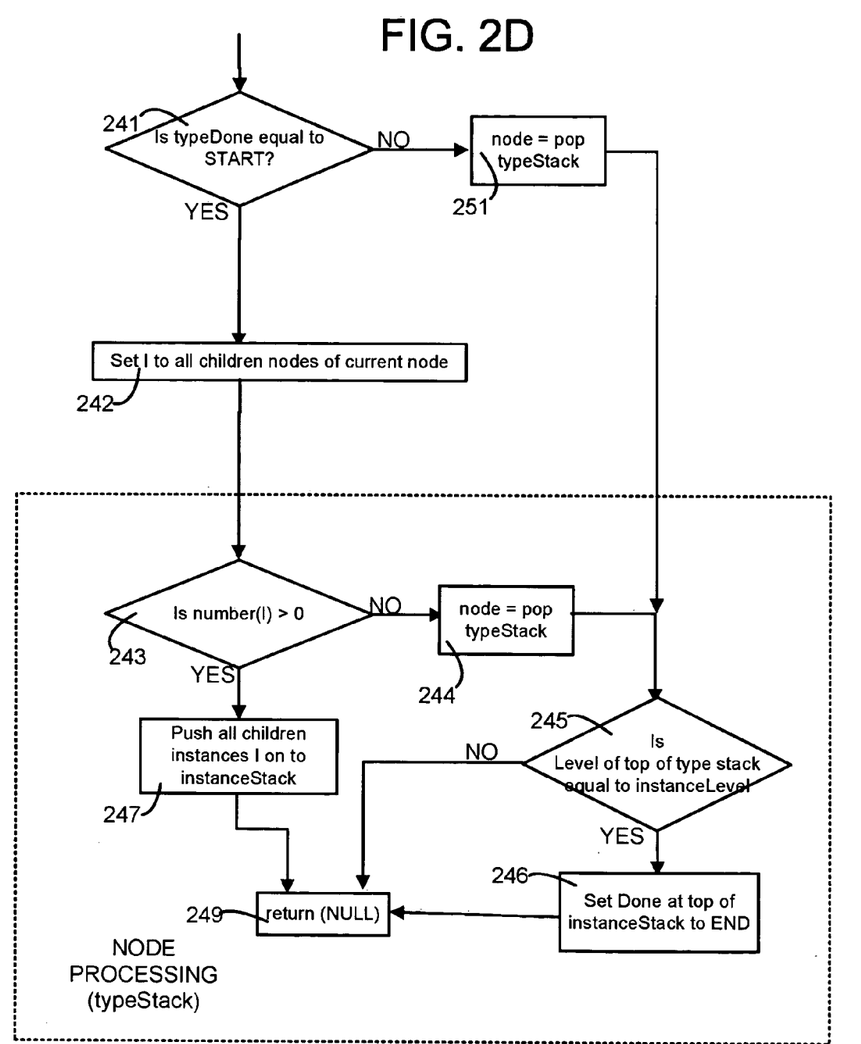

Specifically, the method illustrated in FIGS. 2C-2D uses two stacks, namely an instance stack and a type stack. It also uses a measure of the depth in the tree during traversal as the "level". Furthermore, a variable "done" can have three different values, namely "START" to indicate that the processing is starting, "END" to indicate that processing is completed and "START_END" to indicate that no processing needs to be performed. In this method, initially, all projects are pushed on top of the instance stack and their corresponding project type is pushed on top of the type stack. Thereafter, the acts illustrated in FIGS. 2C and 2D are performed, as described in pseudocode and the related comments at the end of this specification, just before the claims.

Some embodiments optimize the above-described algorithm by componentizing the objects of the metadata repository 152. For example, if a metadata type "table" owns the metadata types "column", "foreign keys" and "unique keys", then the processing of children nodes (illustrated by act 242 in FIG. 2D) is optimized by selecting from a cache that has preloaded all the columns, foreign keys and unique keys that belong to a particular table instance. In so doing, database or file access is limited by such embodiments.

Figure 3A:
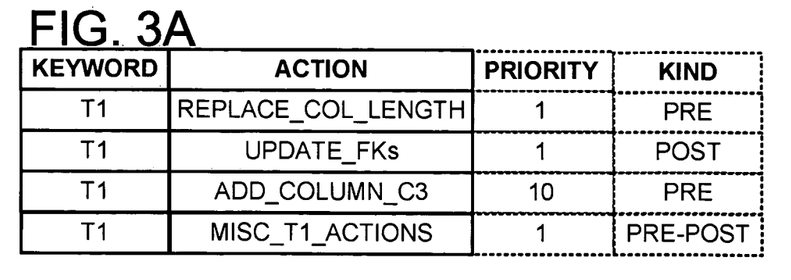
FIG. 3A illustrates, in a block diagram, exemplary rules that are held in a rules store (of the type illustrated in FIG. 1A) for use by rules engine (also of the type illustrated in FIG. 1A).

As noted above, in addition to metadata reader 126, a metadata transformer 120 of some embodiments also includes a rules engine 127 that applies a number of predetermined rules 110 to each metadata object supplied thereto. The rules are stored in a predetermined format which identifies at least two fields, namely a keyword field and an action field. The keyword field is used by rules engine 127 to decide whether or not a metadata object J that is under evaluation triggers the rule. For example, if the keyword field has the value "T1" then the rule is triggered when processing table object "T1" (which is shown as the child of root object "P" in FIG. 2A). Referring to FIG. 3A, all rules illustrated therein are triggered when processing table object "T1."

When any rule is triggered, rules engine 127 uses the action field to invoke a specified function which then performs the necessary action(s). In the example illustrated in FIG. 3A, actions REPLACE_COL_LENGTH, UPDATE_FKS, ADD_COLUMN_C3, and MISC_T1_ACTIONS are all invoked because the keyword T1 is matched by all rules. Rules 110 of some embodiments have one or more fields that are in addition to the just-described keyword and action fields. Specifically, in several embodiments, a priority field enables the actions of all matching rules to be sorted and performed in the order of a specified priority. Moreover, in other embodiments, instead of or in addition to the priority field, there is also a field (called "kind" field) which specifies whether the action is to be performed prior to writing the object, or subsequent to writing the object or partly prior to and partly subsequent to writing the object.

Figure 3B:
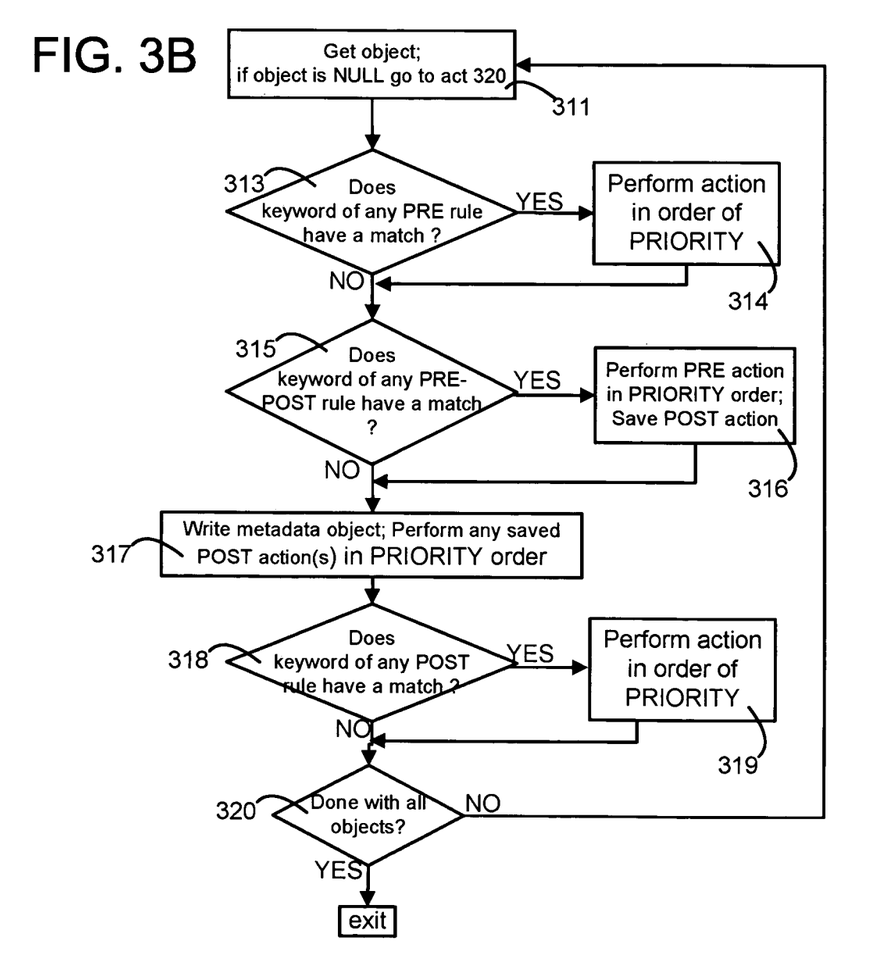
FIG. 3B illustrates, in an intermediate level flow chart, acts performed by rules engine (of the type illustrated in FIG. 1A) when checking if a metadata object (that has been read by a metadata reader) triggers a rule.

In some embodiments, rules engine 127 performs actions 311 and 313-320 that are illustrated in FIG. 3B. Specifically, in act 311, rules engine 127 gets a metadata object, via metadata reader 126. If this object is null, then rules engine goes to act 320 (described below). If the object is not null, then in act 313, rules engine 127 checks if the keyword of any rule of the "PRE" kind has a match. If so, then rules engine 127 performs the action (in act 314) prior to writing of the metadata object, and if there are multiple actions (from multiple matching rules), then they are performed in the order of priority. On completion of act 314 or if there is no match in act 313, rules engine 127 goes to act 315 and checks if the keyword of any rule of the "PRE-POST" kind has a match, and if so it goes to act 316. In act 316, a portion of the action that is to precede writing of the metadata object is now performed (in prioritized order), followed by saving of the action that is to follow the writing. Next, in act 317, the metadata object is written (thereby to add to the changed metadata 155 of FIG. 1A), and then any previously saved actions are performed (in their priority order). Next, in act 318, all triggering rules that have the same keyword, but are of the "POST" kind are found, and if there is even one triggering rule, then act 319 is performed. Specifically, in act 319, the respective actions of the "POST" matching rules are performed. Thereafter, any additional objects are processed in the above described manner.

Note that in several embodiments, rule checking performed by rules engine 127 is optimized by performing all the keyword checks in a single step regardless of the priority and the kind of the rule. Thereafter, all matching rules are sorted by kind and then by priority. Next, the respective actions of the matching rules are performed (in the sorted order), one at a time until finished. Note that in many embodiments, if no rule is triggered, then nothing is done, e.g. if the metadata is being changed (i.e. overwritten) rather than making a new copy for the changed metadata. If a new copy for changed metadata is being made, then the metadata object that was checked (for keyword match) is written to the changed metadata.

As noted above, since only one object (e.g. one record of the database) is processed at any time, only one object needs to be in memory at any given time. This is in contrast to prior art XSLT which requires two trees (of the metadata) to be in memory for performing transformations on the metadata. Use of a metadata transformer 120 of the type described above considerably simplifies the import/export and upgrade of data and metadata by a database upgrader 130 across multiple releases of any hierarchical repository/file-based development tool or application. In some embodiments, database upgrader 130 performs the acts illustrated in FIG. 4. Specifically, in act 401, database upgrader 130 obtains the version of the database that is to be upgraded, and checks in act 402 whether the version is the oldest supported version (in the illustration, the oldest version is "A").

If so, then database upgrader 130 performs operation 403 as follows. Database upgrader 130 loads the rules 110 (FIG. 1A) for transformation of metadata from this version A to the next version B. Then database upgrader 130 invokes the metadata transformer 120 to transform the metadata in the manner described above to yield changed metadata 155 (FIG. 1A). Next, the database upgrader 130 uses the transformed metadata to change database 151 (FIG. 1A). Database upgrader 130 may perform the following acts in some embodiments: export the data from database 151, create a new database using the changed metadata 155, and then import the data into the new database. The resulting database is now at version B.

Figure 4:
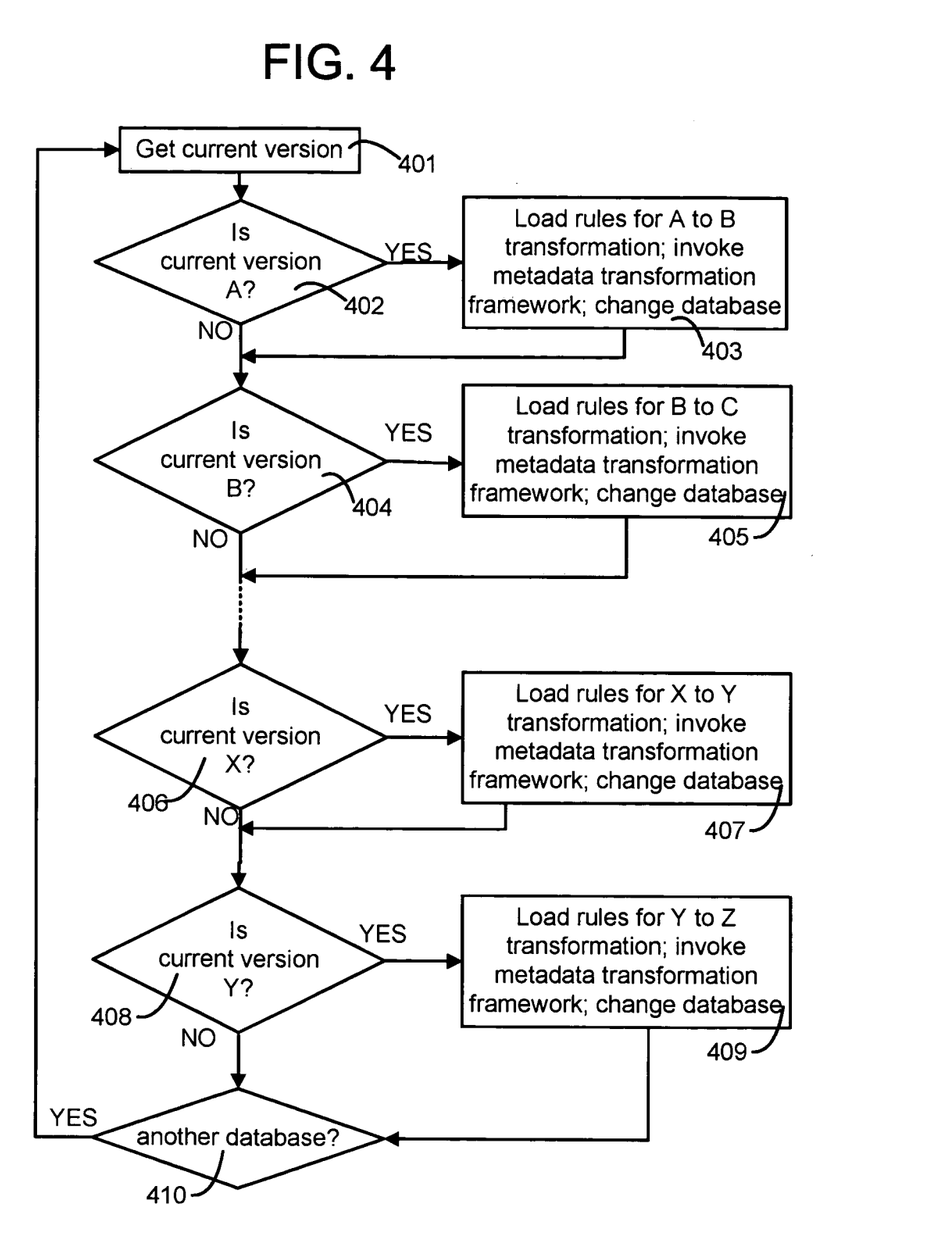
FIG. 4 illustrates, in a high-level flow chart, acts performed by a state machine in accordance with the invention to transform one version of a database to another version.

Next, in act 404 and operation 405, database upgrader 130 performs the same actions as those described above for act 402 and operation 403, except that the database versions are the next successive versions, e.g. version B is checked in act 404 and rules for version B to next version C are loaded in operation 405. Once the resulting database is at version C, the process is repeated again, as often as necessary, e.g. through act 406 and operation 407, and through act 408 and operation 409 until the database reaches the most currently supported version. Thereafter, in act 401, database upgrader 130 checks if there is another database that needs to be upgraded and if so returns to act 401 (described above).

In this manner, the upgrade of one or more databases through a successive series of versions is automatically performed by several embodiments in accordance with the invention. The rules for transformation from each version to the next version are set up only once to identify the differences between the versions (e.g. a database vendor may decide to change a column's precision from 8 to 16), and thereafter the entire process proceeds automatically by use of database upgrader 130 and metadata transformer 120. For this reason, in many embodiments, a user can simply run their client for the next release of a database without having to write any code, when a metadata transformer 120 is used to traverse and change the metadata, regardless of complexity of business logic and complexity of the metadata.

In some embodiments, the above-described framework (which includes a metadata transformer 120 and a database upgrader 130 of FIG. 1A), is used to transition all users between successive versions of Oracle's Warehouse Builder product. As will be apparent to the skilled artisan, any other software product that uses a database can be made to transition through successive versions in a similar manner. As noted above, in some embodiments, such a framework can handle data repositories and metadata repositories in both file systems and database management systems in a seamless manner. Support for both types of systems eliminates the need for a user to convert data and/or metadata from one system to another system. For example, when using such a framework, there is no need to convert metadata from a database to a file, then perform XSL transformation (XSLT), and then load it back into a new database. In contrast, a framework of the type described herein can read metadata from a database management system and also write the metadata to a database management system thereby eliminating file processing altogether (if the user so chooses).

In some embodiments, a common interface is provided for a database management system and a file system, by the following functions. One function gets the type of reader this is (can be database or file) and may be named e.g. getSourceType( ). Another function opens the source, which is a file open for files or a database connection for a schema, and may be named e.g. openSource(String source,String charSet). Yet another function closes the source, which is a file close for files or a database disconnection for a schema, and the function may be named, e.g. closeSource( ). Still another function gets the source name, which is the file name for file and the schema name for the database, and such a function may be named, e.g. getSourceName( ). One more function gets the next object in the tree traversal, and may be named, e.g. getNextObject( ). Note that functions openSource, closeSource and getNextObject throw exceptions as and when necessary.

Also, in some embodiments, the actions are specified as a JAVA class—which is located in a library that gets linked and that gets used during operation of metadata transformer 120. Such actions may change one or more attributes of an object in metadata 152, e.g. change a column's precision from 8 to 16 if necessary to transition from one database version to another. Furthermore, in some embodiments, such actions that are performed in response to a rule being triggered can transform a number of objects that are linked together to form a sub-tree, instead of transforming only one object. For example, if an organization of the sub-tree is being changed (such as cross-component relationship), then such actions are used to process multiple objects. Also, an application such as Oracle's Warehouse Builder may be used to initially support a simple metadata representation of metadata. In a later release, Oracle's Warehouse Builder may be upgraded to support very complex dimensional metadata, and thus older versions need to be transformed into this newer version. The older simple dimensional structure can be transformed by having to handle full or partial tree rearrangements, depending on how complex the transformations are. Certain transformations may need to cache some information about it and if it gets really complex, it could go to a worst case of acting like XSLT. In practice, this is rare because full caching is not done.

Also, in several embodiments, the database is implemented in Oracle version 9.0.4 and many of the instructions that are generated by metadata transformer 120 for reading/writing metadata and/or meta-metadata are expressed in SQL. Moreover, in some embodiments, rules engine 127 contains a hash table, with a key which is the keyword, and a field separator. The keyword and the priority together form the key in several embodiments. In some embodiment, rules engine 127 uses a method described in an article by Charles L. Forgy entitled "Rete: A Fast Algorithm for the Many Pattern/Many Object Pattern Match Problem" published in Artificial Intelligence 19 (1982) 17-37, that is incorporated by reference herein in its entirety.

One embodiment of the type describe herein uses a mediator to access the database management system, and each entity (such as metadata reader 126 and rules engine 127 talks to the mediator before accessing the database). When a record is read, it is stored in the mediator, and the he data in the mediator is always kept current (like a cache). However, the mediator contains only one record. Its primary purpose is to insulate each entity that accesses the database management system from changes that are made within the other entity. Therefore, as long as the mediator remains the same, each of metadata reader 126 and rules engine 127 can be changed as often as necessary, without affecting the other.

Figure 5:
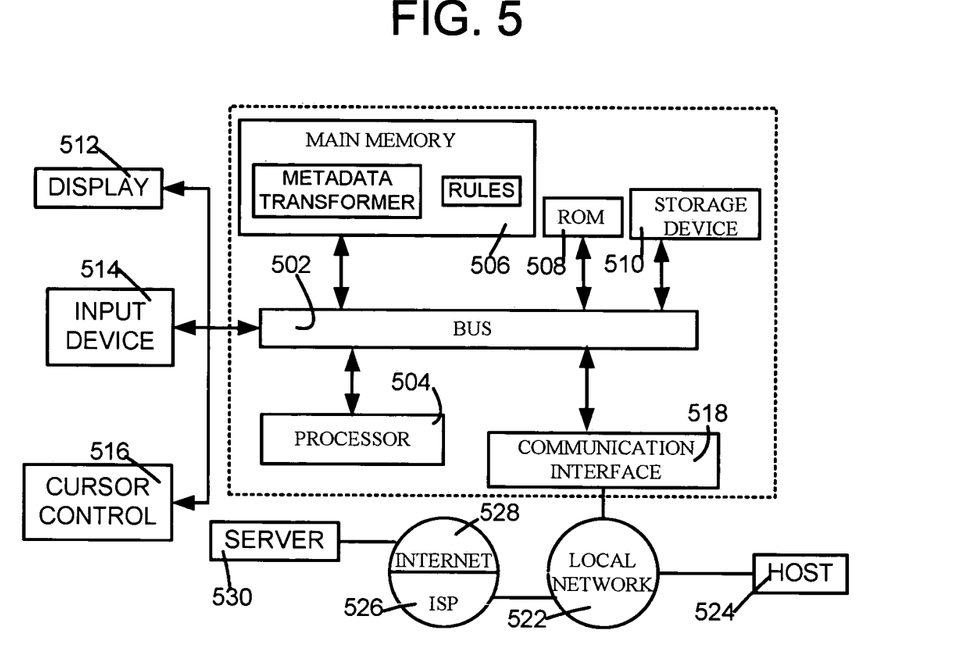
FIG. 5 illustrates, in a high-level block diagram, a computer and related hardware used in some embodiments to execute software of the type illustrated in FIGS. 1A-1B.

Computer 100 of FIG. 1A can be implemented by hardware that forms a computer system 500 as illustrated in FIG. 5. Specifically, computer system 500 includes a bus 502 (FIG. 5) or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

As described elsewhere herein, versioning is provided by computer system 500 in response to processor 504 executing one or more sequences of one or more instructions contained in main memory 506. Such instructions may be read into main memory 506 from another non-transitory computer-readable storage medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "non-transitory computer-readable storage medium" as used herein refers to any non-transitory storage medium that participates in providing instructions to processor 504 for execution. Such a storage medium may take many forms, including but not limited to, non-volatile storage media, and volatile media. Non-volatile storage media includes, for example, optical or magnetic disks, such as storage device 510. Volatile storage media includes dynamic memory, such as main memory 506.

Common forms of non-transitory computer-readable storage media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other non-transitory storage medium from which a computer can read.

Various forms of non-transitory storage media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. Local network 522 may interconnect multiple computers (as described above). For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for implementing fine grain versioning within software configuration management systems as described herein.

The received code may be executed by processor 504 as it is received, and/or stored in storage device 510, or other non-volatile storage for later execution. In this manner, computer system 500 may obtain application code in the form of a carrier wave.

Numerous such modifications and adaptations of the embodiments described herein will be apparent to the skilled artisan in view of the disclosure. Accordingly numerous such modifications and adaptations are encompassed by the attached claims.

At the end of this description before the claims is a listing of pseudo-code for a method illustrated in FIGS. 2C and 2D. As will be apparent to the skilled artisan, the pseudo-code listing is merely illustrative of the invention and is not written in any specific software language to be directly loaded into a computer for execution. The method of FIGS. 2C-2D is normally invoked by act 311 (FIG. 3B) whenever an object is needed. The object returned by the method of FIGS. 2C-2D is then processed by the rules engine to check if any rules are fired, as described above in reference to acts 312-320 (FIG. 3B). On returning to act 311 from act 320, the method of FIGS. 2C-2D is again invoked, and this happens until there are no more objects (see the yes branch from act 320 in FIG. 3B).

In this method, after initial set up (in act 210 described in the first four lines of pseudo code below), act 211 is performed to check if the typeLevel is equal to the instanceLevel (i.e. check how deep the traversal is currently relative to one another, in the type tree and in the instance tree). If they are at the same level, then a decision box 212 is entered to check if the "Done" variable of the stack being processed is equal to START. Note that currently the stack being processed is the instance stack, and hence instanceDone is checked. In act 212, if the answer is no, then a node is popped from the instance stack (as per act 231). Then, a termination condition is checked (e.g. in act 232, the instance stack is checked for being empty in which case the popped node is returned in act 233). If the termination condition is not satisfied, then act 217 is performed to check if the level of the top of the current stack (instance stack) is less than the level of the other stack (type stack). If not, then a return is executed (in act 219), else the top of the other stack (type stack) is set to END and then return is executed (as per acts 218 and 219).

In act 212, if the answer is yes, then an act 213 is performed wherein all the children nodes of the current node are obtained. Next, a decision box 214 is entered to check if the number of children (that were just obtained in act 213) is greater than zero, and if so the children are pushed onto the other stack (type stack) in act 221 and return is executed (per act 219). If the answer in box 214 is no, then act 215 is performed wherein a node is popped from the current stack (instance stack), and then a decision box 217 is entered (described above).

In act 211 if the answer is no, then act 241 (FIG. 2D) is performed. Note that act 241 is similar to act 212 described above (except that the type stack is checked for being at START), and the no branch results in popping a node from the type stack in act 251 (which is similar to act 231), followed by act 245. Act 245 is a decision box which is similar or identical to act 217 except for the difference in stacks. The yes result in box 245 leads to act 246 similar or identical to act 218 and then to return in act 249 which is similar or identical to act 219. A no result in box 245 leads to act 249. Moreover, act 242 is similar or identical to act 213, and thereafter act 243 is performed. Act 243 is a decision box which is similar or identical to act 214 with the yes and no branches leading to acts 247 and 244 respectively (that are similar or identical to acts 221 and 215 respectively). After act 247 then act 249 is performed. And after act 244 then act 245 is performed.

Acts performed on the type stack and on the instance stack are similar or identical in most respects. For example, except for the difference in the stack being operated upon, node processing performed in acts 214, 215, 217, 218, 219 and 221 is identical to node processing performed in acts 243, 244, 245, 246, 249 and 247. Note that one difference in acts 219 and 249 is that in act 249 the value NULL is returned during node processing of typestack, instead of a node which is returned in act 219. Another difference in processing of the two stacks is in the absence of termination condition acts 232 and 233 during processing of the type stack. In all other respects the two stacks are processed in an identical manner. The symmetry in control flow of the processing of the two stacks is illustrated in FIGS. 2C and 2D respectively. Such processing symmetry for the two stacks (wherein a majority of acts performed thereon are identical) provides numerous advantages in some embodiments, including ease of programming and debugging.

PSEUDO-CODE LISTING

```
1   typeLevel:= Top(typeStack).level( )
2   instanceLevel:= Top(instanceStack).level( )
3   typeDone:= Top(typeStack).isDone( )
4   instanceDone:= Top(instanceStack).isDone( )
5
6   if (typeLevel = instanceLevel) then // see act 211 in FIG. 2C
7       if (instanceDone = START) then // see "YES" branch of act 212
8           childTypes:= Top(instanceStack.type) getChildTypes( ) // see
            act 213
9           if childTypes do not exist then // see act 214 "NO" branch
10              node:= instanceStack.pop( ) // see act 215
11              node.setDone(START_END) // see act 216
12              if Top(instanceStack).level( ) < typeLevel then // see
                act 217
13                  Top(typeStack).setDone(END)      // see act 218
14              fi // end Top(instanceStack).level( ) < typeLevel
15              return node // see act 219
16          else // see act 214 "YES" branch (childTypes exist)
17              for all children types of parentType, push onto typeStack //
                see 221
18              return Top(instanceStack) // see act 219
19          fi // end childTypes do not exist
20      else // see "NO" branch of act 212
21          node:= instanceStack.pop( ) // see act 231
22          if (instanceStack.isEmpty( )) then // see act 232
23              return node // see act 233
24              end algorithm //
25          fi // end instanceStack.isEmpty( )
26          if Top(instanceStack).level( ) < typeLevel then //see act 217
27              Top(typeStack).setDone(END)      // see act 218
28          fi // end Top(instanceStack).level( ) < typeLevel
29      fi // end instanceDone = START
30  else if (typeLevel > instanceLevel) then // see FIG. 2D
31      if (instanceDone == START) then    // see act 241 in FIG. 2D
32          process children nodes of parent by pushing all children // see
            act 247
33              elements onto the instance stack as illustrated by act 242
34          if (children do not exist) then    // See act 243 in FIG. 2D
35              typeStack.pop( ) // see act 244
36              if Top(typeStack).level( ) == instanceLevel) then //
                see act 245
37                  Top(instanceStack).setDone(END) // see act 246
38              fi // end Top(typeStack).level( ) == instanceLevel
39          else // children exist
40              push child instances on to instance stack // see act 247
41          fi // end children do not exist
42      else // see act 251 in FIG. 2D
43          typeStack.pop( ) // see act 251
44          if Top(typeStack).level( ) == instanceLevel then // see act 245
45              Top(instanceStack).setDone(END) // see act 246
46          fi // end else Top(typeStack).level( ) == instanceLevel
47      fi // end else instanceDone == START
48  fi // end else typeLevel = instanceLevel
49  return null // act 249
```

The invention claimed is:

1. One or more non-transitory computer-readable storage media comprising a plurality of instructions, the instructions when executed in one or more computers cause the one or more computers to:
read an object comprised in a metadata, the metadata comprising a plurality of objects including the object, the metadata being descriptive of a structure of a database;
check if the object triggers a rule from among a predetermined set of rules; and
change the metadata in accordance with an action associated with the rule, if the rule is triggered by the object;
wherein said instructions to cause the one or more computers to read and said instructions to cause the one or more computers to check are executed, at least once for each object among the plurality of objects comprised in the metadata;
wherein said predetermined set of rules are to be used in transforming said database;
wherein said object is a first object and said metadata is a first metadata;
wherein execution, of said instructions to cause the one or more computers to change, results in a second object in a second metadata; and
use a first version of the database by exporting data therefrom, creating a second version of said database using said second metadata comprising said second object and importing said data;
wherein said first object is comprised in a first tree structure of a plurality of first objects in said first metadata; and
traverse said first tree structure symmetrically with traversal of a second tree, of types of said first objects.

2. The one or more non-transitory computer-readable storage media of claim 1 wherein the plurality of instructions when executed, further cause:
overwriting of the first version of the database with the second version of the database; and
overwriting of the first metadata with the second metadata.

3. The one or more non-transitory computer-readable storage media of claim 1 wherein the plurality of instructions when executed, further cause:
saving of the second metadata to a second resource different from a first resource holding the first metadata.

4. The one or more non-transitory computer-readable storage media of claim 1 wherein:
said predetermined set of rules comprises at least one foreign key to unique key transformation rule.

5. The one or more non-transitory computer-readable storage media of claim 1 wherein:
the first metadata is indicative of at least a table in the database, a plurality of columns of said table, a unique key of said table and a foreign key of said table.

6. The one or more non-transitory computer-readable storage media of claim 5 wherein in the first metadata:
said table is indicated as said first object; and
said columns, said unique key and said foreign key are indicated in the first tree structure as children owned by the first object.

7. A method performed in one or more computers, the method comprising:
reading an object comprised in a metadata, the metadata comprising a plurality of objects including the object, the metadata being descriptive of a structure of a database;
checking if the object triggers a rule from among a predetermined set of rules;
changing the metadata in accordance with an action associated with the rule, if the rule is triggered by the object;
wherein said reading and checking are performed by the one or more computers, at least once for each object among the plurality of objects comprised in the metadata;
wherein said predetermined set of rules are to be used in transforming a first version of said database into a second version of said database;
wherein said object is a first object and said metadata is a first metadata;
wherein said changing results in a second object in a second metadata;

using said first version of the database by exporting data therefrom, creating said second version of said database using said second metadata comprising said second object, and importing said data into said second version of said database; and wherein said first object is comprised in a first tree structure of a plurality of first objects in said first metadata; and traversing said first tree structure symmetrically with traversal of a second tree, of types of said first objects specified in a meta-metadata.

8. The method of claim 7 wherein:
said predetermined set of rules comprises at least one foreign key to unique key transformation rule.

9. The method of claim 7 wherein:
the first metadata is indicative of at least a table in the database, a plurality of columns of said table, a unique key of said table and a foreign key of said table.

10. The method of claim 9 wherein in the first metadata:
said table is indicated as said first object; and
said columns, said unique key and said foreign key are indicated in the tree as children owned by the first object.

11. A system comprising one or more computers, the system comprising:
means for reading an object comprised in a metadata, the metadata comprising a plurality of objects including the object, the metadata being descriptive of a structure of a database;
means for checking if the object triggers a rule from among a predetermined set of rules;
means for changing the metadata in accordance with an action associated with the rule, if the rule is triggered by the object;
wherein said means for reading and said means for checking are repeatedly operated in said one or more computers, at least once for each object among the plurality of objects in the metadata;
wherein said predetermined set of rules are to be used in transforming a first version of said database into a second version of said database;
wherein said object is a first object and said metadata is a first metadata;
wherein operation of said means for changing results in a second object in a second metadata;
means for using said first version of the database by exporting data therefrom, creating said second version of said database using said second metadata comprising said second object, and importing said data into said second version of said database; and
wherein said first object is comprised in a first tree structure of a plurality of first objects in said first metadata; and
means for traversing said first tree structure symmetrically with traversal of a second tree, of types of said first objects specified in a meta-metadata.

12. One or more non-transitory computer-readable storage media comprising a plurality of instructions to be executed in one or more computers, the plurality of instructions comprising:
instructions to read a metadata object comprised in a metadata, the metadata comprising a plurality of metadata objects including the metadata object, the metadata being descriptive of a structure of a database;
instructions to check if the metadata object in the plurality of metadata objects triggers a rule among a predetermined set of rules to be applied to the plurality of metadata objects in the metadata, the predetermined set of rules being stored in a memory; and
instructions to change the metadata object without XSL transformation, in accordance with an action associated with the rule, if the rule is triggered by the metadata object;
wherein a tree comprises the metadata object, and the metadata object is indicative of a table in the database;
wherein the instructions to read are repeatedly executed to visit children and grandchildren of the metadata object in the tree;
wherein the table in the database comprises a plurality of columns represented in the tree as children of the metadata object;
wherein, when the instructions to read are executed, the plurality of metadata objects are read in an order specified in meta-metadata, the meta-metadata being descriptive of a hierarchy of object types for the plurality of metadata objects in the metadata; and
wherein the metadata comprises a relationship of at least one column in the table to another column in another table comprised in the database.

13. The one or more non-transitory computer-readable storage media of claim 12 wherein:
the meta-metadata indicates selection of a table object in the metadata for reading by the instructions to read before selection of a column object owned by said table object.

14. The one or more non-transitory computer-readable storage media of claim 12 wherein:
execution of said instructions to change results in a changed metadata;
the plurality of instructions further comprise instructions to export data from the database, instructions to use the changed metadata to change the database to obtain a chanced database, and instructions to import the data into the chanced database.

15. The one or more non-transitory computer-readable storage media of claim 12 wherein:
said predetermined set of rules comprises at least one foreign key to unique key transformation rule.

16. The one or more non-transitory computer-readable storage media of claim 12 wherein:
the metadata object is indicative of at least the table, the plurality of columns of said table, a unique key of said table and a foreign key of said table.

17. The one or more non-transitory computer-readable storage media of claim 16 wherein in the metadata:
said columns, said unique key and said foreign key are indicated in a tree structure as children owned by the metadata object.

18. A method performed in one or more computers, the method comprising:
reading an object comprised in metadata, the metadata comprising a plurality of objects including the object, the metadata being descriptive of a structure of a database;
checking if the object triggers a rule among a predetermined set of rules to be applied to the plurality of objects in the metadata, the predetermined set of rules being stored in a memory; and
changing the object without XSL transformation, in accordance with an action associated with the rule, if the rule is triggered by the object;
wherein a tree comprises the object, and the object is indicative of a table in the database;
wherein said reading is performed repeatedly to visit children and grandchildren of the object in the tree;

wherein the table in the database comprises a plurality of columns represented in the tree as children of the object;

wherein, during the reading, the plurality of objects are read in an order specified in meta-metadata, the meta-metadata being descriptive of a hierarchy of object types for the plurality of objects in the metadata; and wherein the metadata comprises a relationship of at least one column in the table to another column in another table comprised in the database.

19. The method of claim 18 wherein:

said changing results in a changed metadata; and the method further comprises exporting data from the database, using the changed metadata to change the database to obtain a changed database, and importing the data into the changed database.

20. The method of claim 18 wherein:

said predetermined set of rules comprises at least one foreign key to unique key transformation rule.

21. The method of claim 18 wherein:

the object is indicative of at least the table, the plurality of columns of said table, a unique key of said table and a foreign key of said table.

22. The method of claim 21 wherein in the metadata:

the unique key and the foreign key are indicated in a tree structure as children owned by the object.

23. The method of claim 18 wherein:

the order in the meta-metadata indicates selection of a first table in the metadata before selection of a column owned by said first table.

24. The method of claim 18 wherein:

the meta-metadata comprises a hierarchy of object types and the hierarchy is used to identify the order to read objects in the tree.

25. The method of claim 24 wherein:

the hierarchy comprises a table type object having at least three types of children.

26. The method of claim 25 wherein:

the three types comprise a unique-key type object, a column type object and a foreign-key type object.

27. The method of claim 18 wherein:

an instruction for said reading is expressed in SQL; and said reading is performed by executing at least said instruction.

28. The method of claim 18 wherein:

an organization of a sub-tree in the tree is changed by said changing.

29. The method of claim 28 wherein a cross-component relationship is changed.

30. The method of claim 18 wherein:

said changing results in a changed metadata; and the method further comprises using the changed metadata to create a new version of the database.

31. The method of claim 18 further comprising:

using a first stack to temporarily store object types read from the meta-metadata, and using a second stack to temporarily store objects read from the metadata.

32. The method of claim 31 wherein:

said first stack and said second stack are processed symmetrically.

33. The method of claim 18 wherein:

a column in the table has an attribute represented in the tree as a grandchild comprised in the grandchildren.

34. The method of claim 33 wherein:

the attribute is one of datatype, length, or precision.

35. A system comprising one or more computers, the system comprising:

means for reading an object comprised in metadata, the metadata comprising a plurality of objects including the object, the metadata being descriptive of a structure of a database;

means for checking if the object triggers a rule among a predetermined set of rules to be applied to the plurality of objects in the metadata, the predetermined set of rules being stored in a memory; and means for changing the object without XSL transformation, in accordance with an action associated with the rule, if the rule is triggered by the object;

wherein a tree comprises the object, and the object represents a table in the database;

wherein means for reading is repeatedly operated to visit children and grandchildren of the object in the tree;

wherein the table in the database comprises a plurality of columns represented in the tree as children the object;

wherein, on operation of the means for reading, the plurality of objects are read in an order specified in meta-metadata, the meta-metadata being descriptive of a hierarchy of object types for the plurality of objects in the metadata; and wherein the metadata comprises a relationship of at least one column in the table to another column in another table comprised in the database.

* * * * *

UNITED STATES PATENT AND TRADEMARK OFFICE
CERTIFICATE OF CORRECTION

PATENT NO. : 8,738,663 B2  
APPLICATION NO. : 10/754355  
DATED : May 27, 2014  
INVENTOR(S) : Gonzalez et al.

Page 1 of 1

It is certified that error appears in the above-identified patent and that said Letters Patent is hereby corrected as shown below:

In the Specification

In column 1, line 36, after "granted" insert -- to --.

In the Claims

In column 18, line 35, in Claim 14, delete "chanced" and insert -- changed --, therefor.

In column 18, line 36, in Claim 14, delete "chanced" and insert -- changed --, therefor.

In column 20, line 37, in Claim 35, delete "children the" and insert -- children of the --, therefor.

Signed and Sealed this  
Ninth Day of December, 2014

Michelle K. Lee  
*Deputy Director of the United States Patent and Trademark Office*